US010821963B2

(12) United States Patent
Nefcy et al.

(10) Patent No.: US 10,821,963 B2
(45) Date of Patent: Nov. 3, 2020

(54) COORDINATING NON-DEMAND ENGINE START AND STOP WITH GEAR SHIFT

(71) Applicant: Ford Global Technologies, LLC, Dearborn, MI (US)

(72) Inventors: Bernard D. Nefcy, Novi, MI (US); Daniel Scott Colvin, Farmington Hills, MI (US); Matthew John Shelton, Grosse Ile, MI (US); Mark Steven Yamazaki, Canton, MI (US); Marvin Paul Kraska, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 550 days.

(21) Appl. No.: 15/649,055

(22) Filed: Jul. 13, 2017

(65) Prior Publication Data

US 2017/0305408 A1    Oct. 26, 2017

Related U.S. Application Data

(62) Division of application No. 14/666,695, filed on Mar. 24, 2015, now Pat. No. 9,731,706.

(51) Int. Cl.
*B60W 20/13* (2016.01)
*F02N 11/08* (2006.01)
(Continued)

(52) U.S. Cl.
CPC ............ *B60W 20/13* (2016.01); *B60K 6/442* (2013.01); *B60K 6/50* (2013.01); *B60W 10/02* (2013.01);
(Continued)

(58) Field of Classification Search
CPC ...... B60W 10/02; B60W 10/06; B60W 10/08; B60W 10/11; B60W 20/00; B60W 20/13;
(Continued)

(56) References Cited

U.S. PATENT DOCUMENTS 4,495,576 A    1/1985 Ito
8,287,427 B2    10/2012 Sah et al.
(Continued)

FOREIGN PATENT DOCUMENTS

CN    1831384 A    9/2006
CN    1010233032 A    7/2008
(Continued)

*Primary Examiner* — Jacob S. Scott
(74) *Attorney, Agent, or Firm* — David Kelley; Brooks Kushman P.C.

(57) ABSTRACT

A control strategy is provided for a hybrid vehicle that will increase drivability during low or decreasing driver demands. Coordination between shifting the transmission and stopping or (non-demand) starting of the engine can increase drivability. The vehicle includes a motor/generator with one side selectively coupled to the engine and another side selectively coupled to the transmission. The control strategy acts when an engine start or stop is requested while driver demand is decreasing and a shift of the transmission is demanded. To inhibit these events from proceeding simultaneously, the control strategy delays the engine from starting or stopping until the transmission has finished shifting, or vice versa.

13 Claims, 3 Drawing Sheets

(51) Int. Cl.
| | | |
|---|---|---|
| *B60W 10/02* | (2006.01) | |
| *B60W 10/11* | (2012.01) | |
| *B60W 10/06* | (2006.01) | |
| *B60W 10/08* | (2006.01) | |
| *B60W 20/40* | (2016.01) | |
| *B60K 6/442* | (2007.10) | |
| *B60K 6/50* | (2007.10) | |
| *F16D 48/06* | (2006.01) | |
| *F16H 61/02* | (2006.01) | |
| *F02N 11/10* | (2006.01) | |
| *B60K 6/26* | (2007.10) | |
| *F02N 11/04* | (2006.01) | |
| *B60W 20/00* | (2016.01) | |

(52) U.S. Cl.
CPC ............ *B60W 10/06* (2013.01); *B60W 10/08* (2013.01); *B60W 10/11* (2013.01); *B60W 20/00* (2013.01); *B60W 20/40* (2013.01); *F02N 11/0818* (2013.01); *F02N 11/103* (2013.01); *F16D 48/06* (2013.01); *F16H 61/0213* (2013.01); *B60K 2006/268* (2013.01); *B60W 2510/244* (2013.01); *B60W 2540/10* (2013.01); *B60W 2710/021* (2013.01); *B60W 2710/0666* (2013.01); *B60W 2710/083* (2013.01); *B60W 2710/1005* (2013.01); *B60Y 2300/42* (2013.01); *B60Y 2300/43* (2013.01); *B60Y 2300/60* (2013.01); *B60Y 2300/70* (2013.01); *F02N 11/04* (2013.01); *F02N 11/0825* (2013.01); *F02N 2200/0802* (2013.01); *F02N 2300/2011* (2013.01); *F16D 2500/10412* (2013.01); *F16D 2500/30806* (2013.01); *F16D 2500/30808* (2013.01); *F16D 2500/3161* (2013.01); *F16D 2500/3166* (2013.01); *F16D 2500/31493* (2013.01); *F16D 2500/7041* (2013.01); *Y02T 10/6286* (2013.01); *Y10S 903/915* (2013.01); *Y10S 903/93* (2013.01)

(58) Field of Classification Search
CPC .......... B60W 20/40; B60W 2510/244; B60W 2710/021; B60W 2710/0666; B60W 2710/083; B60W 2710/1005; B60W 2540/10; B60Y 2300/42; B60Y 2300/43; B60Y 2300/60; B60Y 2300/70; F16D 2500/10412; F16D 2500/30806; F16D 2500/30808; F16D 2500/31493; F16D 2500/3161; F16D 2500/3166; F16D 2500/7041; F16D 48/06; F16H 61/0213; Y02T 10/6286; Y10S 903/915; Y10S 903/93; F02N 11/04; F02N 11/0818; F02N 11/0825; F02N 11/103; F02N 2200/0802; F02N 2300/2011
See application file for complete search history.

(56) References Cited

U.S. PATENT DOCUMENTS

| | | | |
|---|---|---|---|
| 8,868,276 B2* | 10/2014 | Tanishima | ............... B60K 6/48 701/22 |
| 2006/0178244 A1 | 8/2006 | Whitton et al. | |
| 2006/0178255 A1 | 8/2006 | Whitton et al. | |
| 2010/0125022 A1 | 5/2010 | Mittelberger et al. | |
| 2011/0320083 A1* | 12/2011 | Nishimura | ............ B60W 20/10 701/22 |
| 2012/0053767 A1 | 3/2012 | Jeon | |
| 2013/0291830 A1* | 11/2013 | Doering | ................. F02D 41/023 123/350 |
| 2013/0296109 A1 | 11/2013 | Nedorezov et al. | |
| 2013/0296124 A1* | 11/2013 | Pietron | ................. B60W 20/40 477/5 |
| 2014/0142796 A1 | 5/2014 | Zollner et al. | |

FOREIGN PATENT DOCUMENTS

| | | |
|---|---|---|
| CN | 103347766 A | 10/2013 |
| CN | 103391869 A | 11/2013 |
| CN | 103978975 A | 8/2014 |
| CN | 105128861 A | 12/2015 |

* cited by examiner

COORDINATING NON-DEMAND ENGINE START AND STOP WITH GEAR SHIFT

CROSS-REFERENCE TO RELATED APPLICATIONS

This application is a division of U.S. application Ser. No. 14/666,695 filed Mar. 24, 2015, now U.S. Pat. No. 9,731,706 issued Aug. 15, 2017, the disclosure of which is hereby incorporated in its entirety by reference herein.

TECHNICAL FIELD

This disclosure generally relates to coordinating engine activity with gear shifts in a hybrid vehicle. More particularly, this disclosure relates to prohibiting either a non-demand engine start or stop until a gear shift is completed, or vice versa, in a series-parallel hybrid vehicle.

BACKGROUND

Hybrid electric vehicles include both an engine and at least one electric machine (motor/generator) to provide drive torque to the wheels. There are various types of hybrid electric vehicles. For example, a "parallel" hybrid vehicle typically includes clutches that selectively enable either or both the engine and the motor to provide drive torque. A "series" hybrid vehicle typically includes an electric motor that is always driveably connected to the road wheels, and an engine that is not mechanically connected to the wheels. In other words, the engine does not provide any of the torque required to propel the vehicle. Rather, in a series hybrid vehicle, the engine powers a generator to produce electrical energy that is stored in the battery and/or used by the motor. A "series-parallel" hybrid takes advantage of both series and parallel hybrids. A clutch separates the engine from the electric machine, which may be arranged along a common dimensional axis. This allows the electric machine to still propel the vehicle alone, but also allows the engine to be connected and propel the vehicle and, optionally, charge the electric machine while propelling the vehicle.

A series-parallel hybrid, for example, is provided with the benefit of being capable of operating in a plurality of drive modes. In an electric mode, the electric machine alone propels the vehicle. In an engine mode, the engine alone propels the vehicle. In a hybrid mode, both power sources propel the vehicle. In a regeneration mode, the engine can be disconnected from the electric machine or, if connected, arranged to consume as little or no fuel as possible. If it is connected, the engine will decelerate the vehicle by converting the mechanical movement into losses, while the electric machine converts mechanical movement into electric energy to be stored in the battery.

In such a hybrid vehicle, there is a shift schedule for the electric mode, a shift schedule for hybrid mode, and a shift schedule for regeneration mode. Each shift schedule attempts to place the electric machine, engine, or both in the most efficient or best power-operating point for the respective drive mode. During a tip-out shift in the transmission, the vehicle state may move from electric mode to hybrid mode, or from electric mode to regeneration mode, or from hybrid mode to electric mode due to some other event not related to a driver action (such as the state-of-charge of the battery being depleted or being full). Simultaneous engine starting/stopping or transmission shifting may reduce drivability.

SUMMARY

According to one embodiment, a vehicle comprises an engine, an electric machine, and a clutch arranged to selectively couple the engine and the electric machine. The vehicle also includes a transmission selectively coupled to the electric machine. A controller in the vehicle is programmed to, in response to a command to disengage the clutch to decouple the engine from the electric machine being received while the transmission is being downshifted, delay disengaging the clutch until the downshift is complete.

The electric machine can operate as a motor to propel the vehicle, or as a generator to generate electric energy from rotational movement.

In another embodiment, a vehicle comprises an engine, a motor/generator selectively mechanically coupled to the engine, and a transmission selectively mechanically coupled to the electric machine. A controller in the vehicle is programmed to, in response to a request to start the engine received while driver demand is decreasing and a shift of the transmission is demanded, delay shifting the transmission until the engine has started.

In yet another embodiment, a method of controlling a powertrain is provided. The method includes increasing a time between a demanded shift in a transmission selectively coupled to an electric machine and an actual shift in the transmission in response to a state-of-charge of a traction battery falling below a threshold value resulting in a request to start an engine selectively coupled to the electric machine while a decreased driver demand results in the demanded shift.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
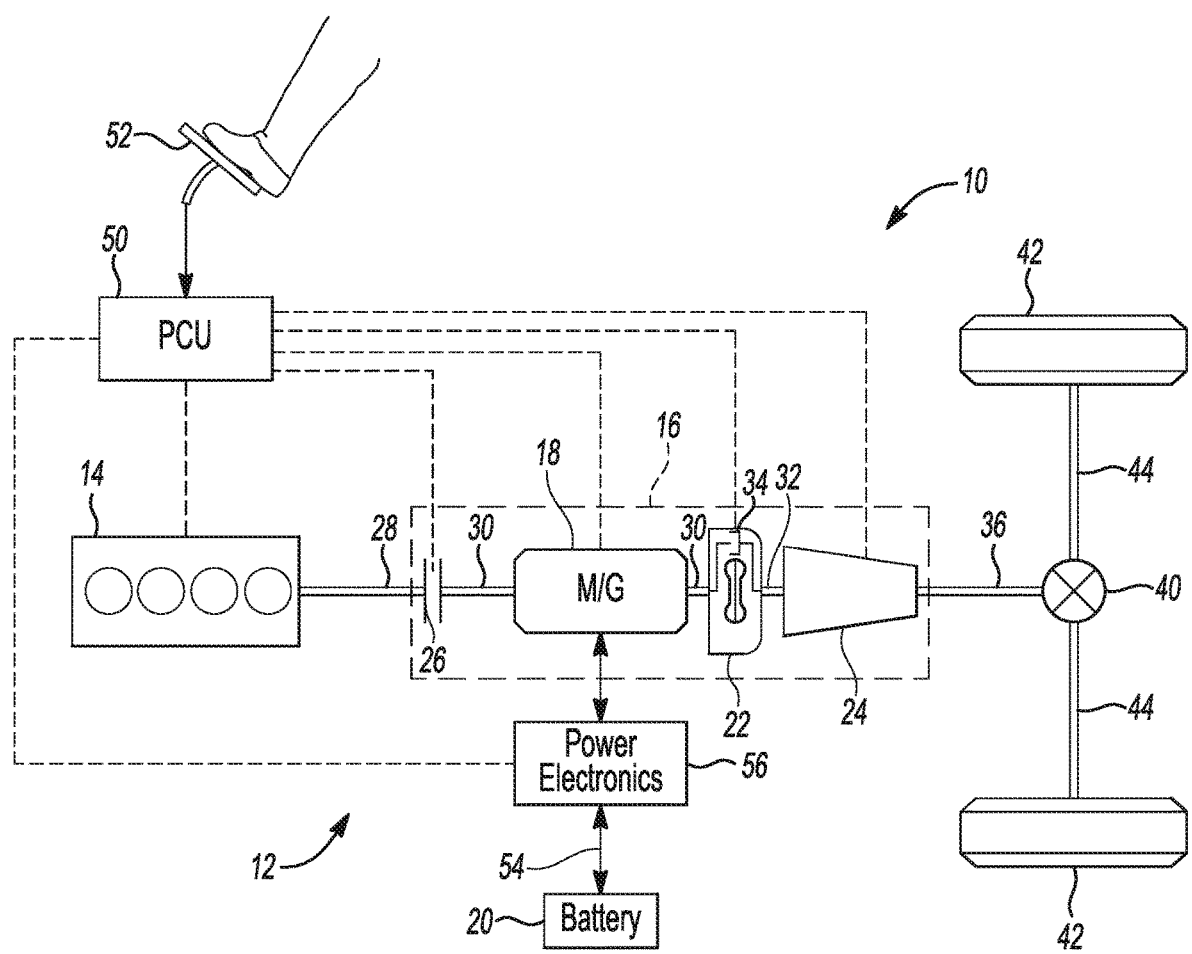
FIG. 1 is a schematic representation of one embodiment of a hybrid vehicle utilizing a control strategy described herein.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

The M/G 18 may be limited in ability to output necessary torque in high-demand situations. For example, if the HEV is operating in the motor-only mode and the driver increases the accelerator pedal depression to indicate a need for higher torque demands, the controller 50 has options available to increase the actual drive torque. To fulfill demanded torque, the controller 50 may command the engine 14 to start such that the vehicle can operate in either the hybrid mode or engine-only mode. The controller 50 may alternatively command a downshift in the transmission 24. The controller 50 may command both a downshift and an engine-start in order to provide sufficient torque through the driveline as fast as possible to meet the increased driver demand. These two operations occurring simultaneously may cause poor drivability. However, during these times of rapid increase in driver-demanded torque, drivability can be sacrificed somewhat in order to quickly meet the driver demands with accurate, precise torque outputs. In other words, it might be more important to match the driver's torque demands during times of high increases in high driver-demanded torques rather than assuring a smooth transition when activating the engine.

The engine 14 may also be started during times of stagnant or decreasing torque demands. These engine-starts can be referred to as "non-demand starts," as the engine is commanded to start not based on torque demands. In one example, the vehicle may be operating in the electric-only mode, causing a decline in the state-of-charge (SOC) of the battery 20. A non-demand engine start may be requested such that the engine 14 can provide the required drive torque while the M/G 18 can convert torque into electrical energy to be stored in the battery 20 to recharge the battery 20.

Also during decreased or stagnant driver demands, the engine may be requested to stop. For example, the controller 50 may command a change in operational mode form the hybrid mode to the electric-only mode and thereby shut off the engine 14 based on a decrease in torque demands provided by the driver.

When either a non-demand engine start or an engine stop coincides with a shifting in gears of the transmission, drivability may suffer. Because demands are decreasing or are relatively low at these times, particular focus on smoothness and drivability must be given. The driver of the vehicle will not be as tolerant of harshness when driver demands are relatively low or decreasing as compared to situations described above when driver demand increases to cause the engine to start or the transmission to downshift.

According to the present disclosure, a controls strategy is provided for a hybrid vehicle, such as one described above, that will increase drivability during low or decreasing driver demands. Coordination between shifting the transmission and stopping or (non-demand) starting of the engine can increase drivability.

Figure 2:
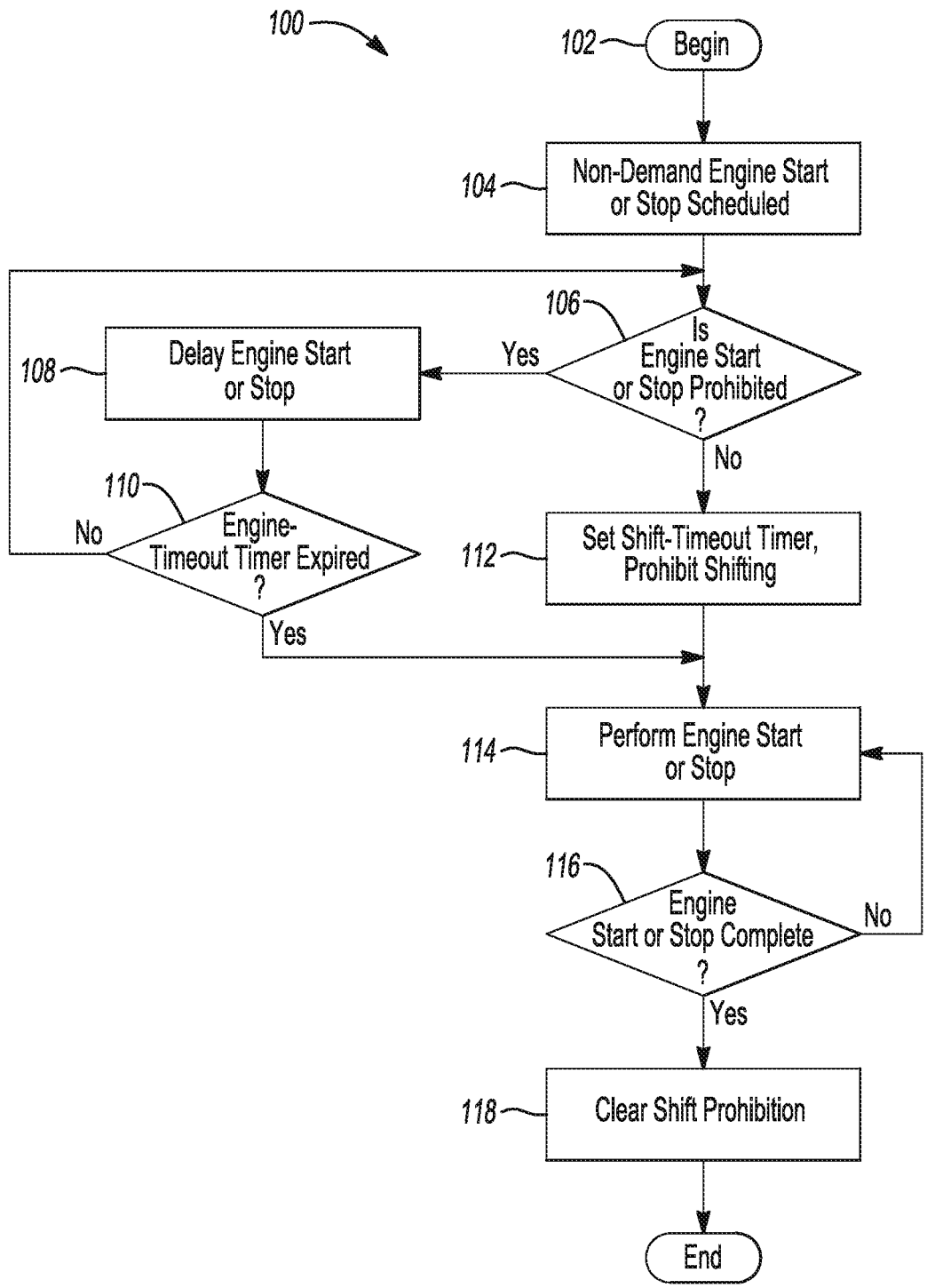
FIG. 2 is a flowchart illustrating a control strategy for prohibiting a transmission from shifting gears until a non-demand engine start or stop is complete.

Referring to FIG. 2, a process or method that includes an algorithm stored in memory and implemented by the controller(s) 50 is illustrated at 100. The process at 100 is implemented to delay the beginning of a shift in the transmission gearbox until a non-demand engine start or stop is complete such that the two events do not occur simultaneously and cause reduced drivability. The process begins at 102.

At 104, a non-demand engine start or stop is scheduled to occur. As explained above, this non-demand engine start occurs not based on an increase in driver demands, but rather as a function of a need for additional charging of the battery, for example. At 106, the controller determines whether an engine start or engine-stop is prohibited. This is determined from the steps of 212 and 218 as described below. If there is an engine start or engine-stop prohibition, the controller will command a delay in the engine start or stop commands at 108. At 110, the controller determines whether an engine-timeout timer (determined from the step of 212 described below) has expired. If the timer has expired, the process proceeds to step 114 which will be described below.

If, however, the engine-timeout timer has not expired, the process loops back to step 106 and determines whether the engine start or stop prohibition is still commanded. Once the prohibition no longer exists (as determined at step 218 below), the process proceeds to 112 in which the controller sets a shift-timeout timer, which is utilized in step 210 described below. Shifting gears in the transmission is also prohibited at this time, and this prohibition is not cleared until step 118 described below. This prohibition allows the engine to start/stop without the transmission shifting gears.

To illustrate this, at step 114 the controller commands the non-demand engine start or stop. Step 116 illustrates a control to allow the engine start or stop to complete until proceeding to step 118 in which the shift prohibition is cleared. Clearing of the shift prohibition (which was activated in step 112) allows the transmission to shift gears according to its shift schedule calling for such action.

Figure 3:
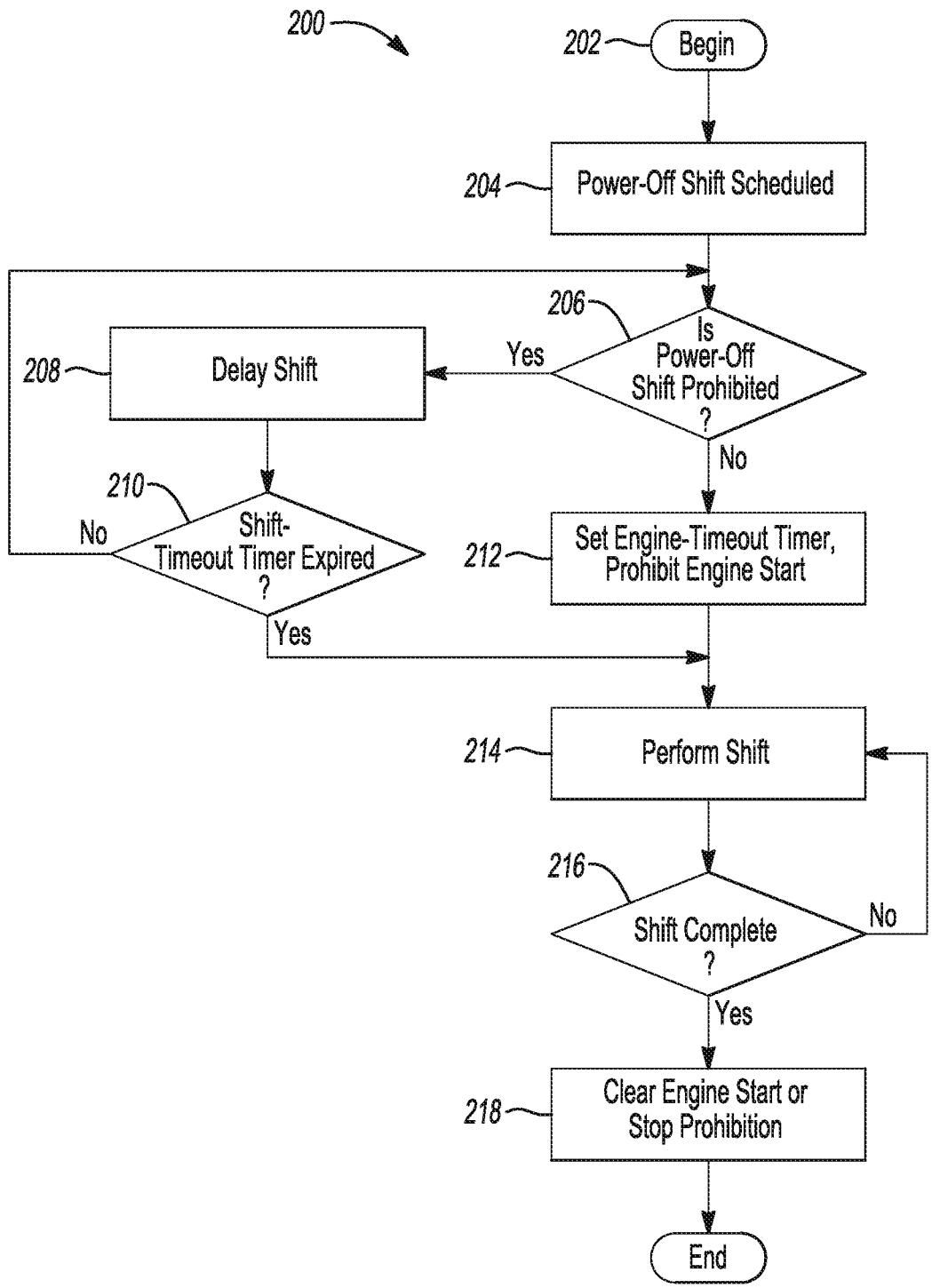
FIG. 3 is a flowchart illustrating a control strategy for prohibiting the engine from stopping or starting until the gear shifting in the transmission is complete.

Referring to FIG. 3, another process or method that includes an algorithm stored in memory and implemented by the controller(s) 50 is illustrated at 200. The process at 200 is implemented to delay a non-demand engine start or stop until a gear shift is complete such that the two events do not occur simultaneously and cause reduced drivability. The process begins at 202.

At 204, a power-off shift scheduled to occur. A shift table can be based on accelerator pedal position and transmission output speed. Alternatively, the driver torque demand could be used instead of the accelerator pedal input. When the accelerator pedal position or driver torque demand in combination with the transmission output speed produce a signal to indicate a shift in the transmission. A "power-off" shift means a shift occurring at a time in which the accelerator pedal is being lifted, i.e., during accelerator tip-out. For example, a power-off shift may be a downshift occurring during times that the driver is coasting and allowing the vehicle to decelerate without braking. These shifts are opposed to a "power-on" shift, in which the shift is scheduled in response to a tip-in or depression of the accelerator pedal position. Both types of shifts can occur whether the engine is on or off.

Based on a power-off shift being scheduled to occur, the process proceeds to step 206. At 206, the controller determines whether power-off shift is prohibited. This was determined from steps 106, 118 above. If there is shift prohibition, the controller will command a delay in the shift of the transmission at 208. At 210, the controller determines whether a shift-timeout timer (set at step 112 described below) has expired. If the timer has expired, the process proceeds to step 214 which will be described below.

If, however, the shift timer has not expired, the process loops back to step 206 and determines whether the power-off shift prohibition is still commanded. Once the prohibition no longer exists (as determined at step 118 above), the process proceeds to 212 in which the controller sets a engine-timeout timer, which is utilized in evaluating step 110 described above. Starting and stopping the engine is also prohibited at this time, and this prohibition is not cleared until step 218 described below. This prohibition allows the transmission to shift gears without the engine starting or stopping.

To illustrate this, at step 214 the controller commands the transmission to shift gears. Step 216 illustrates a control to allow the gear shift to complete until proceeding to step 218 in which the engine start or stop prohibition is cleared. Clearing of the engine start/stop prohibition (which was activated in step 212) allows the transmission to shift gears according to its shift schedule calling for such action.

As described above, FIG. 2 illustrates a control strategy for prohibiting the transmission from shifting gears until the non-demand engine start or stop is complete and the prohibition is lifted. FIG. 3 illustrates a control strategy for prohibiting the engine from accomplishing a stop or start until the gear shifting is complete and the prohibition is lifted. While illustrated as two separate control strategies, one should understand that these control strategies are part of an overall system to prohibit the engine from starting/stopping at the same time as a gear shift. The two control strategies communicate with one another, as many steps in one strategy determine information necessary for the other strategy.

It should also be understood that the shift-timeout timer at 112 or the engine-timeout timer at 212 can set to any predetermined time to allow one transient event (e.g., downshift) to occur without simultaneously commanding another transient event (e.g., non-demand engine start). The timers can also be gear-dependent, or based on other schema (e.g., torque, speed, etc.). The timers can be set, for example, at any increment of a tenth of a second, such as 0.5 or 0.6 seconds.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
an engine;
a motor/generator selectively mechanically coupled to the engine;
a transmission selectively mechanically coupled to the motor/generator; and
a controller programmed to, in response to a request to start the engine received while driver demand is decreasing and a shift of the transmission is demanded, delay shifting the transmission until the engine has started.

2. The vehicle of claim 1, further comprising a battery electrically coupled to the motor/generator, wherein the request to start the engine is based on a state of charge of the battery.

3. The vehicle of claim 2, wherein the controller is further programmed to, in response to the engine being started, output engine torque at a magnitude that exceeds the driver demand and convert excess engine torque into electrical energy via the motor/generator.

4. The vehicle of claim 1, further comprising a clutch configured to selectively mechanically couple the motor/generator to the engine, wherein the controller is further programmed to increase torque output of the motor/generator and engage the clutch to start the engine while the driver demand is decreasing.

5. The vehicle of claim 1, wherein the shift is a downshift.

6. The vehicle of claim 1, wherein the controller is further programmed to delay shifting the transmission until a predetermined time period has expired.

7. A method of controlling a powertrain of a vehicle, comprising:
receiving a signal indicating a decrease in driver demand;
during the decrease in driver demand, receiving a signal indicating a request to start an engine selectively mechanically coupled to a motor/generator;
during the decrease in driver demand, inhibiting a shift of a transmission selectively mechanically coupled to the motor/generator; and
shifting the transmission in response to the engine starting.

8. The method of claim 7, wherein the signal indicating a request to start the engine is sent based on a state of charge of a battery electrically coupled to the motor/generator.

9. The method of claim 8, further comprising, in response to the engine being started, outputting engine torque at a magnitude that exceeds the driver demand and convert excess engine torque into electrical energy via the motor/generator.

10. The method of claim 7, further comprising, in response to receiving the signal indicating the request to start the engine, increasing a torque output of the motor/ generator and engaging a clutch between the engine and motor/generator to start the engine while the driver demand is decreasing.

11. The method of claim 7, further comprising, in response to receiving the signal indicating the request to start the engine, starting the engine via an additional motor.

12. The method of claim 7, wherein the shifting is downshifting.

13. The method of claim 7, wherein the inhibiting takes place for a predetermined time period.

* * * * *